United States Patent
Prager (10) Patent No.: US 10,843,795 B2
(45) Date of Patent: Nov. 24, 2020

(54) FOLDING CONCENTRICALLY MOUNTED PROPELLER BLADES FOR DRAG REDUCTION

(71) Applicant: Wing Aviation LLC, Mountain View, CA (US)

(72) Inventor: André Prager, Sunnyvale, CA (US)

(73) Assignee: Wing Aviation LLC, Mountain View, CA (US)

( * ) Notice: Subject to any disclaimer, the term of this patent is extended or adjusted under 35 U.S.C. 154(b) by 240 days.

(21) Appl. No.: 16/007,918

(22) Filed: Jun. 13, 2018

(65) Prior Publication Data

US 2019/0382106 A1 Dec. 19, 2019

(51) Int. Cl.
B64C 27/50 (2006.01)
B64C 29/00 (2006.01)
B64C 11/28 (2006.01)
B64C 27/02 (2006.01)

(52) U.S. Cl.
CPC .............. B64C 27/50 (2013.01); B64C 11/28 (2013.01); B64C 27/022 (2013.01); B64C 29/0025 (2013.01)

(58) Field of Classification Search
CPC ... B64C 27/50; B64C 27/022; B64C 29/0025; B64C 11/28; B64C 11/48; B64C 2027/7205
See application file for complete search history.

(56) References Cited

U.S. PATENT DOCUMENTS

| 2,021,481 | A | | 11/1935 | Dornier | |
| 2,239,670 | A | * | 4/1941 | Burgess | B64C 27/022 244/139 |
| 2,369,276 | A | | 8/1943 | Cameron et al. | |
| 3,592,412 | A | | 7/1971 | Glatfelter | |
| 4,204,806 | A | | 5/1980 | Blanchard | |
| 5,183,384 | A | | 2/1993 | Trumbly | |
| 6,234,422 | B1 | * | 5/2001 | Bolonkin | B64C 27/026 244/17.11 |
| 6,371,726 | B1 | | 4/2002 | Jonsson et al. | |
| 7,118,066 | B2 | | 10/2006 | Allen | |

(Continued)

FOREIGN PATENT DOCUMENTS

| CN | 204688404 U | 10/2015 |
| CN | 105836123 A1 | 8/2016 |
| WO | 2010005390 A1 | 1/2010 |

OTHER PUBLICATIONS

Written Opinion of the International Searching Authority, dated Oct. 10, 2019 for corresponding International Patent Application No. PCT/US2019/036292, 11 pages.

*Primary Examiner* — Rodney A Bonnette
(74) *Attorney, Agent, or Firm* — Christensen O'Connor Johnson Kindness PLLC (57) ABSTRACT

A propulsion unit includes a motor rotor, propeller blades, and a pivot stop. The motor rotor spins about a central rotational axis. The propeller blades, including first and second propeller blades, each having a proximal base mounted to the motor rotor such that the propeller blades are rotatable about the central rotational axis. The second propeller blade is pivotally attached to the motor rotor to pivot about the central rotational axis independent of the motor rotor by a limited angle. The pivot stop mechanically limits an amount of pivoting of the second propeller blade relative to the first propeller blade.

23 Claims, 6 Drawing Sheets

(56) References Cited

U.S. PATENT DOCUMENTS

| | | | |
|---|---|---|---|
| 7,159,817 B2 | 1/2007 | VanderMey et al. | |
| 7,757,991 B2 * | 7/2010 | Tanabe | B64C 27/001 244/1 N |
| 8,376,264 B1 * | 2/2013 | Hong | B64C 27/26 244/17.23 |
| 9,694,911 B2 | 7/2017 | Bevirt et al. | |
| 10,392,104 B1 * | 8/2019 | Urban | B64C 11/28 |
| 10,494,088 B1 * | 12/2019 | Coralic | B64C 27/10 |
| 10,669,869 B1 * | 6/2020 | Urban | F01D 7/02 |
| 2016/0001879 A1 | 1/2016 | Johannesson et al. | |
| 2016/0304194 A1 | 10/2016 | Bevirt et al. | |
| 2017/0274978 A1 | 9/2017 | Beckman et al. | |
| 2019/0092461 A1 * | 3/2019 | Duffy | B64C 11/04 |

* cited by examiner

FOLDING CONCENTRICALLY MOUNTED PROPELLER BLADES FOR DRAG REDUCTION

TECHNICAL FIELD

This disclosure relates generally to propeller blade mounts, and in particular but not exclusively, relates to propeller blade mounts for unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) or drones are becoming more popular in general. As their designs are refined and their capabilities expanded, their suitability for commercial use is expected to expand. Designs that improve the efficiency and endurance of UAVs will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for folding propeller blades to reduce aerodynamic drag resistance are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein describe mechanical structures and techniques for pivot mounting propeller blades to a motor rotor that enable passive folding of the propeller blades from a deployed position when in use to a stowed position when idle. The stowed position provides reduced drag during forward flight. In one embodiment, the folding of the propeller blades to the stowed position is passively achieved by wind resistance while unfolding back to the deployed position is achieved via pivot stops that engage the propeller blades into rotationally offset positions relative to each other. In another embodiment, inertia and motor braking may also be used to aid passive folding or actively initiate folding of the propeller blades to the stowed position.

While the propeller blade mounting structure is applicable for use in a variety of vehicle applications, the described techniques are particularly useful in applications having separate propulsion units for horizontal and vertical propulsion. In particular, the described techniques are well suited for vertical takeoff and landing aerial vehicles.

Figure 1:
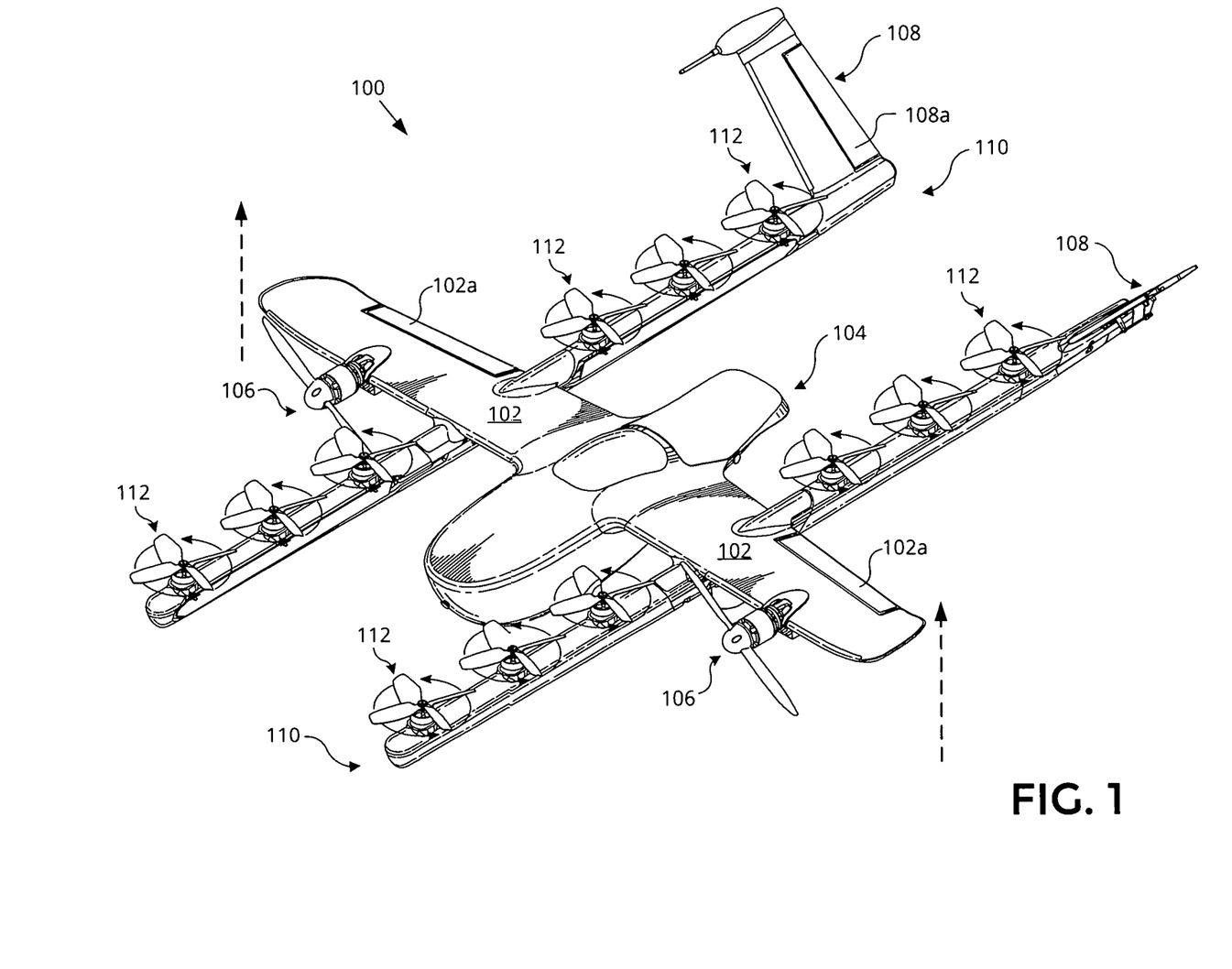
FIG. 1 is a perspective view illustration of an aerial vehicle with propeller blades of vertical propulsion units in a deployed position, in accordance with an embodiment of the disclosure.
Figure 2:
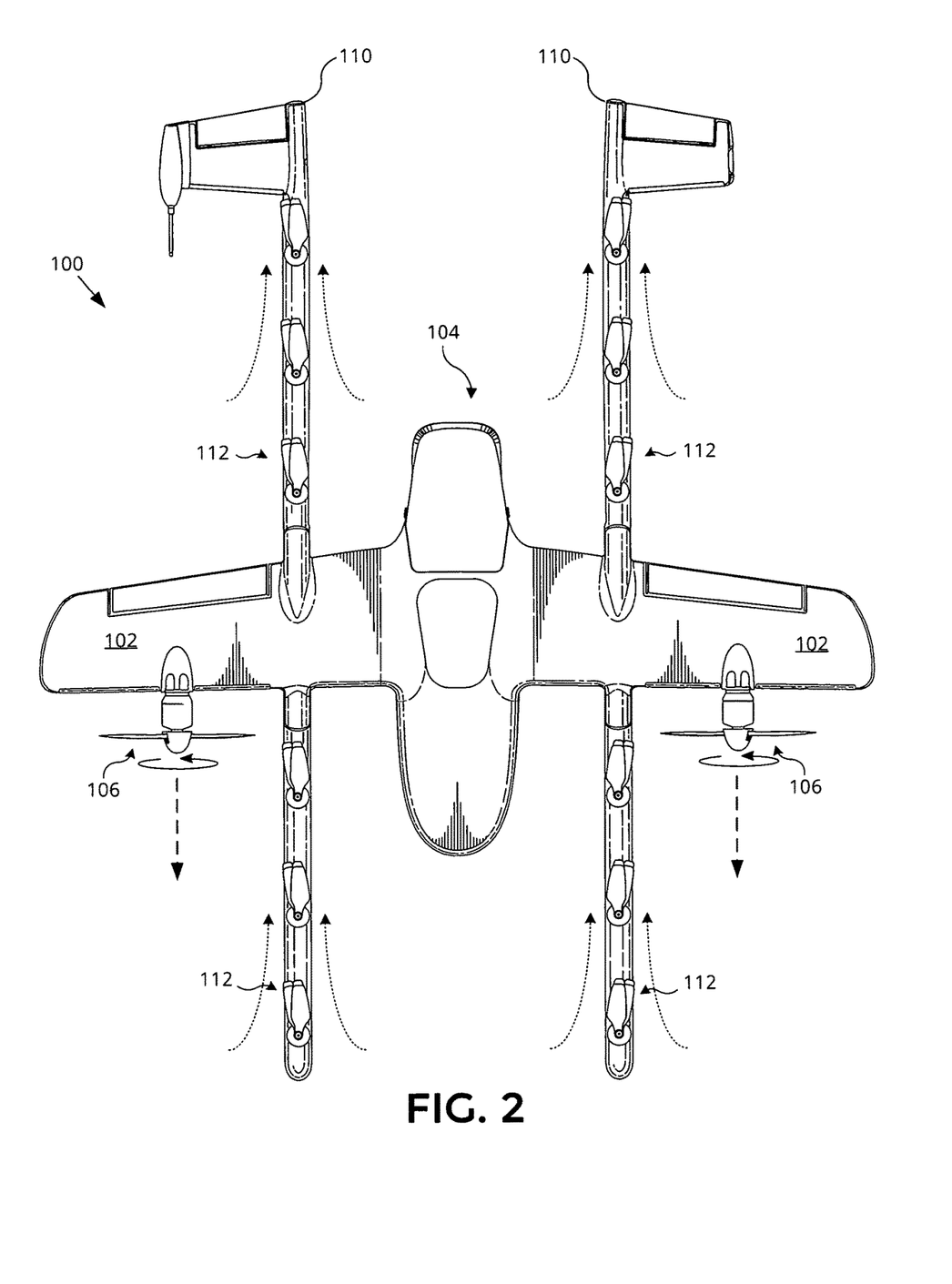
FIG. 2 is a plan view illustration of an aerial vehicle with propeller blades of the vertical propulsion units in a stowed position, in accordance with an embodiment of the disclosure.

FIGS. 1 and 2 illustrate an aerial vehicle 100, in accordance with an embodiment of the disclosure. The illustrated embodiment of aerial vehicle 100 is a vertical takeoff and landing (VTOL) unmanned aerial vehicle (UAV) that includes separate propulsion units 106 and 112 for providing horizontal and vertical propulsion, respectively. Aerial vehicle 100 is a fixed-wing aerial vehicle, which as the name implies, has a wing assembly 102 that can generate lift based on the wing shape and the vehicle's forward airspeed when propelled horizontally by propulsion units 106. FIG. 1 is a perspective view illustration of aerial vehicle 100 operating during a vertical takeoff or landing with the propeller blades of vertical propulsion units 112 deployed to provide vertical propulsion. FIG. 2 is a plan view illustration of aerial vehicle 100 operating in a horizontal cruise mode with the propeller blades of vertical propulsion units 112 idle (i.e., not spinning) and stowed to reduce a drag profile during forward motion. As illustrated, the propeller blades of vertical propulsion units 112 are stowed and passively align for reduced drag due to wind resistance resulting from the forward motion of aerial vehicle 100. In contrast, the propeller blades of vertical propulsion units 112 are deployed in FIG. 1 due to engagement of pivot stops when vertical propulsion units 112 are spinning.

The illustrated embodiment of aerial vehicle 100 has an airframe that includes a wing assembly 102, a fuselage 104, and boom assemblies 110. In one embodiment, fuselage 104 is modular and includes a battery module, an avionics module, and a mission payload module. These modules may be detachable from each other and mechanically securable to each other to contiguously form at least a portion of the fuselage or main body.

The battery module includes a cavity for housing one or more batteries for powering aerial vehicle 100. The avionics module houses flight control circuitry of aerial vehicle 100, which may include a processor and memory, communication electronics and antennas (e.g., cellular transceiver, wife transceiver, etc.), and various sensors (e.g., global positioning sensor, an inertial measurement unit (IMU), a magnetic compass, etc.). The mission payload module houses equipment associated with a mission of aerial vehicle 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.).

As illustrated, aerial vehicle 100 includes horizontal propulsion units 106 positioned on wing assembly 102, which can each include a motor, a motor rotor with shaft, and propeller blades, for propelling aerial vehicle 100 horizontally. The illustrated embodiment of aerial vehicle 100 further includes two boom assemblies 110 that secure to wing assembly 102. Vertical propulsion units 112 are mounted to boom assemblies 110. Vertical propulsion units 112 can each also include a motor, a motor rotor with shaft, and propeller blades, for providing vertical propulsion. As mentioned above, vertical propulsion units 112 may be used during a hover mode where aerial vehicle 100 is descending (e.g., to a delivery location), ascending (e.g., following a delivery), or maintaining a constant altitude. Stabilizers 108 (or tails) may be included with aerial vehicle 100 to control pitch and stabilize the aerial vehicle's yaw (left or right turns) during cruise. In some embodiments, during cruise mode vertical propulsion units 112 are disabled and during hover mode horizontal propulsion units 106 are disabled. In other embodiments, vertical propulsion units 112 are merely powered low during cruise mode and/or horizontal propulsion units 106 are merely powered low during hover mode.

During flight, aerial vehicle 100 may control the direction and/or speed of its movement by controlling its pitch, roll, yaw, and/or altitude. Thrust from horizontal propulsion units 106 is used to control air speed. For example, the stabilizers 108 may include one or more rudders 108*a* for controlling the aerial vehicle's yaw (and pitch due to the V-tail configuration illustrated) and wing assembly 102 may include ailerons 102*a* for controlling the aerial vehicle's roll. In other embodiments, aerial vehicle 100 may include elevators for independently controlling pitch. As another example, increasing or decreasing the speed of all the propeller blades simultaneously can result in aerial vehicle 100 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 1 and 2 illustrate one wing assembly 102, two boom assemblies 110, two horizontal propulsion units 106, and six vertical propulsion units 112 per boom assembly 110, it should be appreciated that other variants of aerial vehicle 100 may be implemented with more or less of these components. Furthermore, although FIGS. 1 and 2 illustrate the propulsion units (both vertical and horizontal propulsion units) as each including four propeller blades, in various embodiments, the propulsion units may include two, three, or more than four propeller blades.

Figure 3:
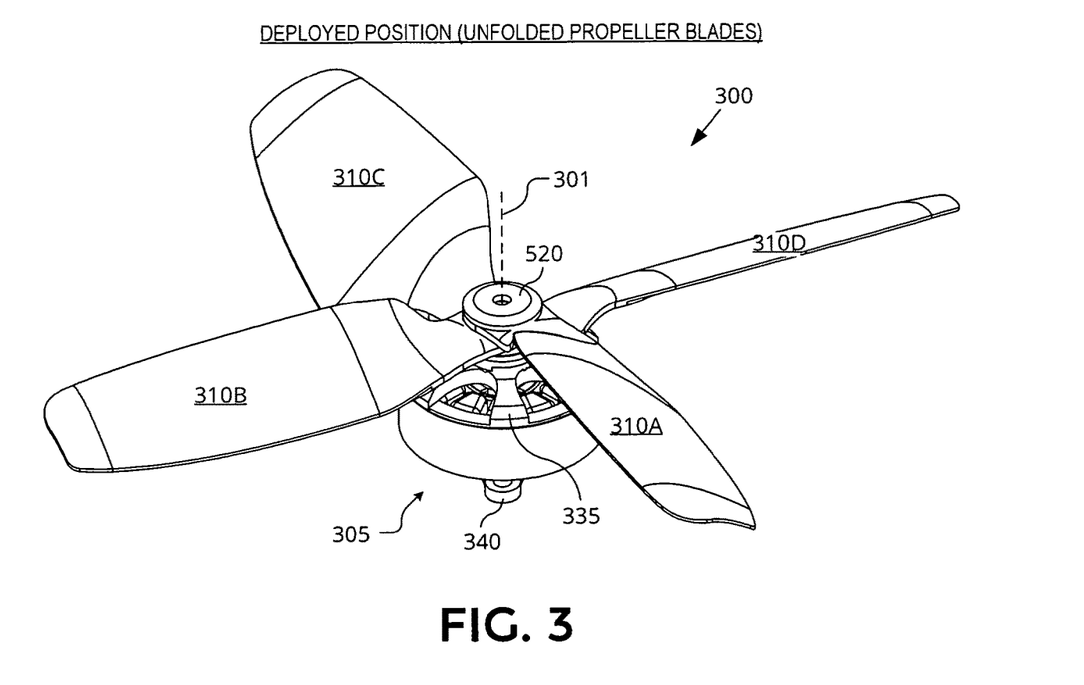
FIG. 3 is a perspective view illustration of a propulsion unit with propeller blades in the deployed position, in accordance with an embodiment of the disclosure.
Figure 4A:
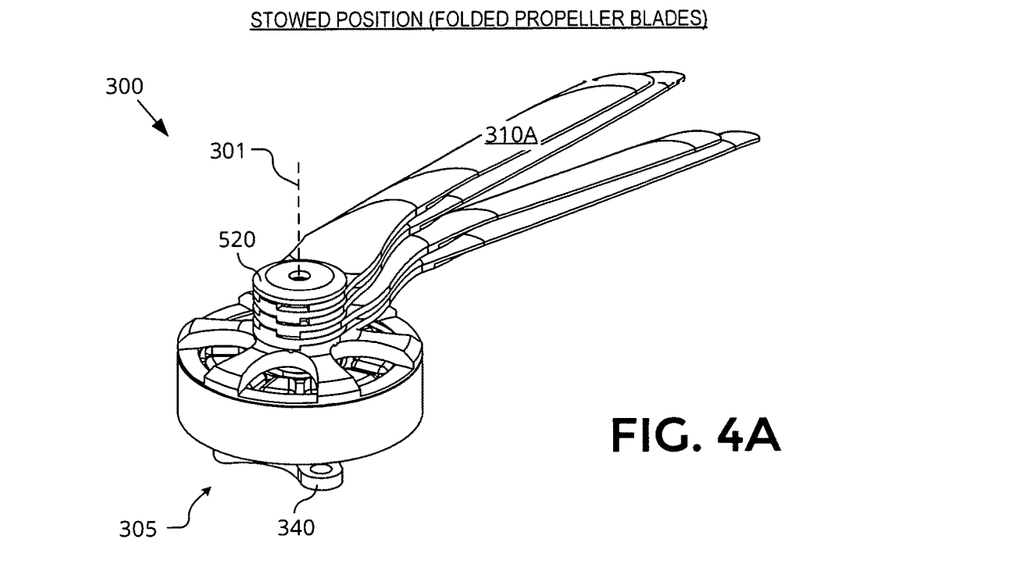
FIG. 4A is a perspective view illustration of the propulsion unit with propeller blades in the stowed position, in accordance with an embodiment of the disclosure.
Figure 4B:
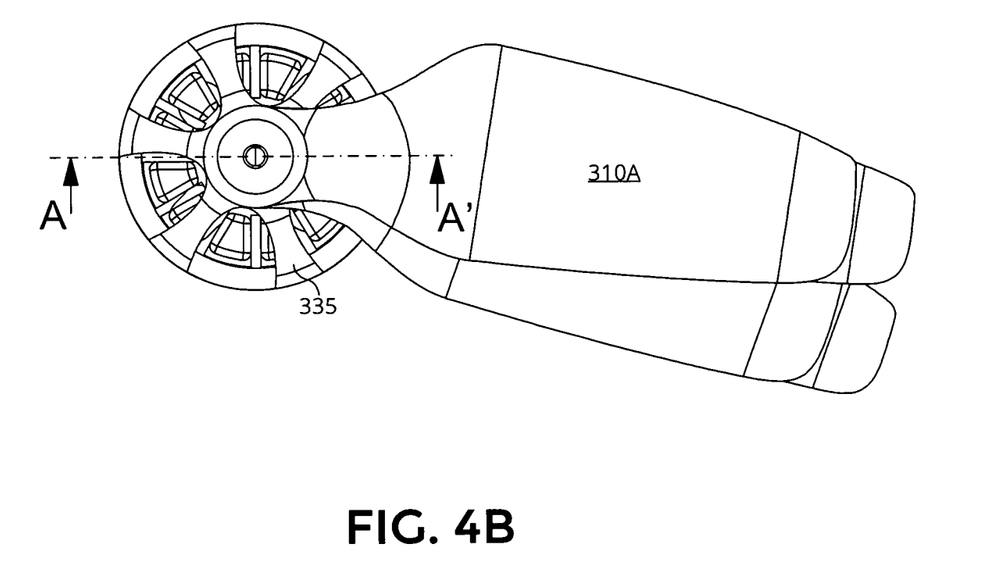
FIG. 4B is a plan view illustration of the propulsion unit with propeller blades in the stowed position, in accordance with an embodiment of the disclosure.
Figure 4C:
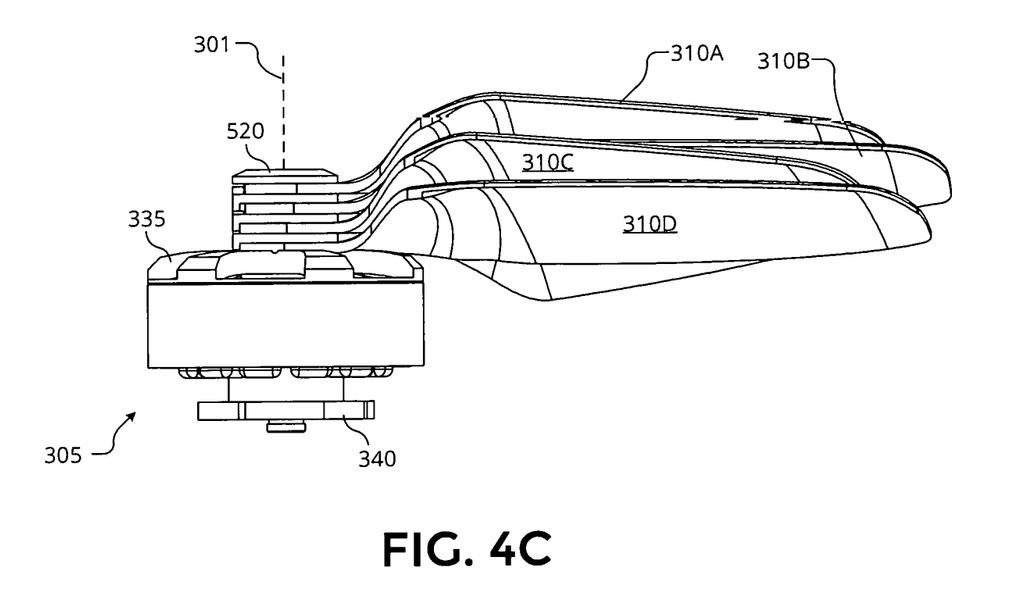
FIG. 4C is a side view illustration of the propulsion unit with propeller blades in the stowed position, in accordance with an embodiment of the disclosure.
Figures 5A, 5B:
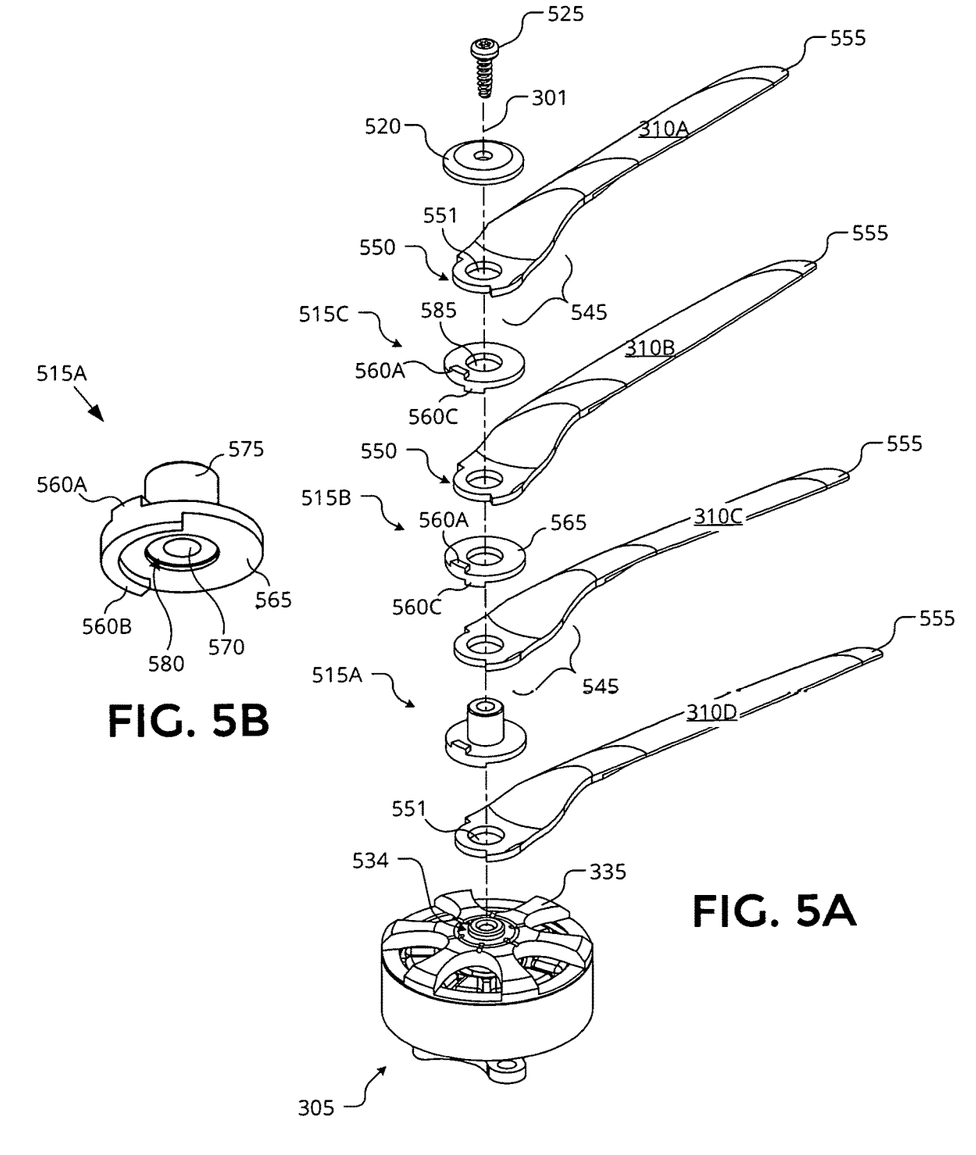
FIG. 5A is an exploded view illustration of the propulsion unit with folding propeller blades, in accordance with an embodiment of the disclosure.
FIG. 5B is a perspective view illustration of a base insert spacer that includes a washer flange, alignment boss, and a pivot stop, in accordance with an embodiment of the disclosure.
Figure 6:
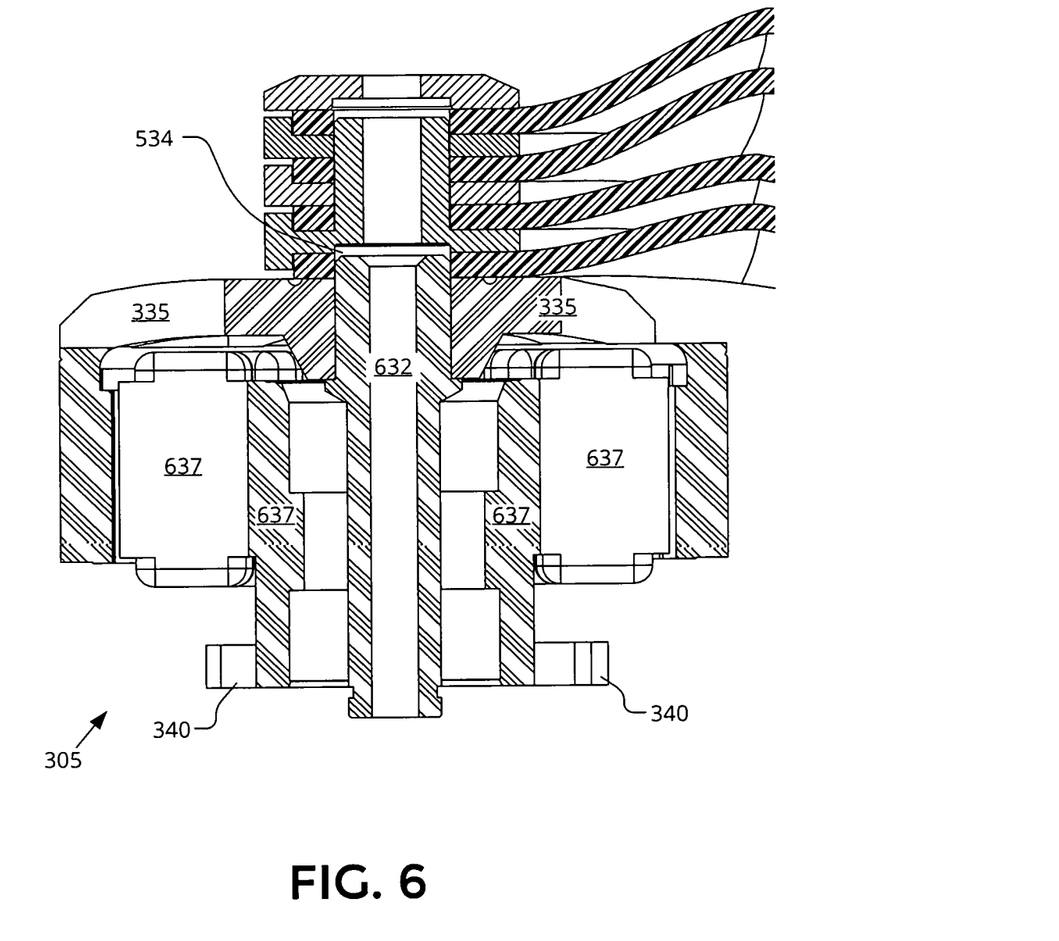
FIG. 6 is a cross-sectional view illustration of the propulsion unit with folding propeller blades, in accordance with an embodiment of the disclosure.

FIGS. 3, 4A, 4B, 4C, 5A, 5B, and 6 are different views illustrating various aspects of a propulsion unit 300 (e.g., a vertical propulsion unit 112), in accordance with an embodiment of the disclosure. FIG. 3 is a top perspective view of propulsion unit 300 having propeller blades in a deployed position, FIGS. 4A-C are various views of propulsion unit 300 having propeller blades in a stowed position, FIG. 5A is an exploded view of propulsion unit 300, and FIG. 6 is cross-sectional illustration of propulsion unit 300 along ling A-A' in FIG. 4B.

The illustrated embodiment of propulsion unit 300 includes a motor base 305, propeller blades 310A-D (collectively 310), insert spacers 515A-C (collectively 515), a retainer cap 520, and a mechanical fastener 525. The illustrated embodiment of motor base 305 includes a motor rotor, a stator 637, and a motor mount 340. The illustrated embodiment of the motor rotor includes a rotor shaft 632, a protruding ridge 534, and a rotor bell 335. The illustrated embodiments of propeller blades 310 each include a proximal base 545 and a distal tip 555. Proximal bases 545 each include a cutout 550 and a hole 551. The illustrated embodiment of insert spacer 515A includes pivot stops 560A and 560B disposed on a washer flange 565 having a hole 570, an alignment boss 575, and a recess 580. The illustrated embodiment of insert spacers 515B-C each include pivot stops 560A and 560C along with a washer flange 565 having a hole 585. It should be appreciated that not all instances of elements have been labelled so as not to over clutter the drawings.

As illustrated in FIGS. 3 and 4A, propeller blades 310 are mounted to motor base 305 in a manner that permits them to pivot from an unfolded, deployed position (FIG. 3) to a folded, stowed position (FIG. 4A). The transitions from unfolded to folded or folded to unfolded can be passively controlled transitions, or actively initiated. Propeller blades 310 deploy (unfold) when the motor rotor spins up and the propeller blades' inertia/drag causes engagement of pivot stops 560A and 560C with cutouts 550 in proximal bases 545 of propeller blades 310. This engagement rotationally accelerates propeller blades 310 into the deployed position. In one embodiment, the bottom most propeller blade 310D is non-pivotally attached to the motor rotor to rotate about central rotational axis 301 in a fixed relation to the motor rotor. In contrast, propeller blades 310A-C are pivotally attached to the motor rotor to pivot about central rotational axis 301 independent of the motor rotor by a limited angle relative to each other.

Referring to FIG. 5A, pivot stops 560A & 560C engage against the terminal ends of cutouts 550 to spin up propeller blades 310A-C but also slide within the cutouts 550 to allow a limited amount of pivoting relative to each other and to the motor rotor to permit folding to the stowed position. When the motor rotor stops spinning, wind resistance due to forward motion of aerial vehicle 100 causes propeller blades 310A-D to pivot to the smaller cross-sectional, lower drag, stowed position. Accordingly, the stowed position reduces the drag profile of propulsion unit 300 in a direction that is orthogonal to central rotational axis 301. FIGS. 4A, 4B, and 4C illustrate different views of this reduced drag profile.

FIGS. 5A and 5B illustrate details of the pivot stops that facilitate the limited pivoting of propeller blades 310A-C. As illustrated, pivot stops 560 are protrusions integrated into insert spacers 515. In other embodiments, pivot stops 560 may be posts, fasteners, or otherwise that attached to insert spacers 515. Insert spacers 515 are inserted between each propeller blade 310. In the illustrated embodiment, the bottom most insert spacer 515A includes alignment boss 575, which inserts through holes 551 of propeller blades 310A-C and holes 585 of the other insert spacers 515B and 515C. Alignment boss 575 serves several purposes. First, alignment boss 575 locates and aligns the upper propeller blades 310A-C and insert spacers 515B-C for rotation about central rotation axis 301. Second, alignment boss 575 serves as the rotation bearing for the upper propeller blades 310A-310C. Third, alignment boss 575 is a fixed length offset to which retainer cap 520 is clamped via mechanical fastener 525. Alignment boss 575 is designed to have a suitable length for clamping proximal bases 545 of propeller blades 310A-C to limit undue slop or dihedral bending of propeller blades 310A-C while permitting propeller blades 310A-C to pivot relative to each other. In fact, the length of alignment boss 575 should be selected so that propeller blades 310A-C will pivot to the stowed position merely under the influence of wind resistance at a typical cruising speed for aerial vehicle 100 when propulsion unit 300 is not spinning.

In one embodiment, folding of propeller blades 310 may be actively triggered/initiated via short reverse torque impulses by the motor. These motor torque impulses may briefly spin (or just deaccelerate) the motor in reverse (e.g., less than one revolution) to initiate folding, which passively aligns with wind resistance. Accordingly, the blades inertia may be used to help actively initiate folding to the stowed position. In some embodiment, small propeller blade diameters may require reverse torque impulses to initiate folding due to limited wind resistance on the propeller blades themselves.

Insert spaces 515 each include a washer flange 565 having a widened surface that aids in controlling the dihedral bending of propeller blades 310, but also serves to offset the propeller blades 310 relative to each other along central rotational axis 301 by a fixed offset. This "vertical" offset of each propeller blade 310 facilitates the folding of the propeller blades 310 into the stowed position without jamming the aerodynamic surfaces (e.g., leading or trailing edges of the propeller blades, etc.) into each other. In one embodiment, the vertical offset provided by washer flanges 565 is minimized. In one embodiment, washer flanges 565 are integrated into proximal bases 545 of propeller blades 310. This vertical mounting offset also facilitates a concentric mounting of holes 551 of propeller blades 310 along central rotational axis 301 so that all propeller blades 310 rotate about a common axis (i.e., central rotational axis 301). Concentric mounting of propeller blades 310 lends itself well to a reduced cross-sectional profile when propeller blades 310 are stowed.

In the illustrated embodiment, the lower propeller blade 310D is mounted in fixed relation to the motor rotor. In other words, propeller blade 310D does not have a limited amount of pivot relative to the motor rotor. In one embodiment, propeller blade 310D is the only propeller blade that does not pivot independent of the motor rotor. Accordingly, when propeller blade 310D folds to the stowed position under the influence of wind resistance, propeller blade 310D is also rotating the motor rotor. In the illustrated embodiment, insert spacer 515A firmly clamps proximal base 545 of propeller blade 310D to the motor rotor under abutting compression translated through alignment boss 575 from mechanical fastener 525. In the illustrated embodiment, pivot stop 560B is larger than the other pivot stops 560C. In one embodiment, pivot stop 560B is sized to match cutout 550 on propeller blade 310D so as not to permit any pivoting relative to the motor rotor. Rather, pivot stop 560B serves as a ledge to balance the compression forces from mechanical fastener 525.

Insert spacer 515A also includes recess 580 in the bottom side of washer flange 565. Recess 580 is sized to mate with protruding ridge 534 on the motor rotor. Recess 580 is an alignment feature that centers the upper components (propeller blades 310 and insert spacers 515) with center rotational axis 301 of the motor rotor. In one embodiment, protruding ridge 534 is the butt end of rotor shaft 632. In other embodiment, protruding ridge 534 may be a component of rotor bell 335.

Pivot stops 560 distribute the unfolding of propeller blades 310 with equal rotational separation angles when fully deployed. Accordingly, in the illustrated embodiment of propulsion unit 300 having four propeller blades 310, the center-to-center rotational offset between propeller blades 310 when fully deployed is 90 degrees. However, the propeller mounting technique described herein is equally applicable to propulsion units have two, three, or more propeller blades. In a bi-prop configuration, pivot stops 560 would distribute the propeller blades by 180 degrees. In a tri-prop configuration, pivot stops 560 would distribute the propeller blades by 120 degrees. Of course the number of insert spacers 515 will change based upon the number of propeller blades.

In the illustrated embodiment, pivot stops 560 are integrated into insert spacers 515. This design permits the use of multiple instances of a single common propeller blade 310. However, in other designs, pivot stops 506 may be integrated into the proximal base 545 of each propeller blade 310. Alternatively, a single pivot stop 560 may be integrated into rotor bell 335 and the terminal ends of each cutout 550 staggered for propeller blades 310.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A propulsion unit, comprising:
a motor rotor that spins about a central rotational axis;
propeller blades, including first and second propeller blades, each having a proximal base mounted to the motor rotor such that the propeller blades are rotatable about the central rotational axis, wherein the second propeller blade is pivotally attached to the motor rotor to pivot about the central rotational axis independent of the motor rotor by a limited angle;
a pivot stop to mechanically limit an amount of pivoting of the second propeller blade relative to the first propeller blade; and
a washer flange disposed between the proximal bases of the first and second propeller blades to offset the second propeller blade relative to the first propeller blade along the center rotational axis.

2. The propulsion unit of claim 1, wherein the propeller blades fold or unfold between a deployed position that provides propulsion and a stowed position having a reduced drag profile in a direction that is orthogonal to the central rotational axis.

3. The propulsion unit of claim 1, wherein the first propeller blade is non-pivotally attached to the motor rotor to rotate about the central rotational axis in a fixed relation to the motor rotor.

4. The propulsion unit of claim 1, wherein the pivot stop comprises a pair of rotationally offset protrusions extending from opposite sides of the washer flange that engage cutouts in the proximal bases of the first and second propeller blades.

5. The propulsion unit of claim 1, further comprising:
an alignment boss attached to and extending from the washer flange about which a hole in the proximal base of the second propeller blade is located.

6. The propulsion unit of claim 5, wherein the washer flange includes a recess that mates to and aligns with a protruding ridge on the motor rotor.

7. The propulsion unit of claim 5, further comprising:
a retainer cap for clamping the propeller blades and the washer flange to the motor rotor; and
a mechanical fastener that inserts through holes in the retainer cap and the alignment boss to thread into the motor rotor.

8. A propulsion unit, comprising:
a motor rotor that spins about a central rotational axis;
propeller blades, including first, second, and third propeller blades, each having a proximal base mounted to the motor rotor such that the propeller blades are rotatable about the central rotational axis, wherein the second propeller blade is pivotally attached to the motor rotor to pivot about the central rotational axis independent of the motor rotor by a limited angle;
a pivot stop to mechanically limit an amount of pivoting of the second propeller blade relative to the first propeller blade; and
a second pivot stop integrated onto a second washer flange disposed to offset the proximal bases of the second and third propeller blades.

9. The propulsion unit of claim 8, wherein the pivot stop and the second pivot stop offset rotational positions of the propeller blades relative to each other by equal angles when the propeller blades are unfolded to a deployed position.

10. The propulsion unit of claim 8, wherein the propeller blades further include a fourth propeller blade, the propulsion unit further comprises:
a third pivot stop integrated onto a third washer flange disposed between the proximal bases of the third and fourth propeller blades.

11. An aerial vehicle, comprising:
an airframe;
a horizontal propulsion unit mounted to the airframe and oriented to provide horizontal propulsion to the aerial vehicle; and
a vertical propulsion unit mounted to the airframe and oriented to provide vertical propulsion to the aerial vehicle, the vertical propulsion unit including:
a motor rotor that spins about a central rotational axis;
propeller blades, including first and second propeller blades, each having a proximal base mounted to the motor rotor such that the propeller blades are rotatable about the central rotational axis, wherein the second propeller blade is pivotally attached to the motor rotor to pivot about the central rotational axis independent of the motor rotor by a limited angle;
a pivot stop disposed relative to the first and second propeller blades to mechanically limit an amount of pivoting of the second propeller blade relative to the first propeller blade; and
a washer flange disposed between the proximal bases of the first and second propeller blades to offset the second propeller blade relative to the first propeller blade along the center rotational axis.

12. The aerial vehicle of claim 11, wherein the propeller blades of the vertical propulsion unit fold or unfold between a deployed position that provides the vertical propulsion and a stowed position having a reduced drag profile during a forward motion of the aerial vehicle.

13. The aerial vehicle of claim 12, wherein the propeller blades unfold to the deployed position by engaging the pivot stop between the first and second propeller blades when the motor rotor of the vertical propulsion unit is spinning and fold to the stowed position due to a wind resistance resulting from the forward motion of the aerial vehicle when the motor rotor of the vertical propulsion unit is not spinning.

14. The aerial vehicle of claim 12, wherein the vertical propulsion unit is adapted to apply a reverse torque impulse to initiate folding of the propeller blades to the stowed position.

15. The aerial vehicle of claim 11, wherein the first propeller blade is non-pivotally attached to the motor rotor to rotate about the central rotational axis in a fixed relation to the motor rotor.

16. The aerial vehicle of claim 11, wherein the pivot stop comprises a pair of rotationally offset protrusions extending from opposite sides of the washer flange that engage cutouts in the proximal bases of the first and second propeller blades.

17. The aerial vehicle of claim 11, further comprising:
an alignment boss attached to and extending from the washer flange about which a hole in the proximal base of the second propeller blade is located.

18. The aerial vehicle of claim 17, wherein the washer flange includes a recess that mates to and aligns with a protruding ridge on the motor rotor.

19. The aerial vehicle of claim 11, wherein the propeller blades further include a third propeller blade, the aerial vehicle further comprises:

a second pivot stop integrated onto a second washer flange disposed between the proximal bases of the second and third propeller blades.

20. The aerial vehicle of claim 19, wherein the pivot stop and the second pivot stop offset rotational positions of the propeller blades relative to each other by equal angles when the propeller blades are unfolded to a deployed position.

21. An aerial vehicle, comprising:
an airframe;
a horizontal propulsion unit mounted to the airframe and oriented to provide horizontal propulsion to the aerial vehicle; and
a vertical propulsion unit mounted to the airframe and oriented to provide vertical propulsion to the aerial vehicle, the vertical propulsion unit including:
a motor rotor that spins about a central rotational axis;
propeller blades, including first and second propeller blades, each having a proximal base mounted to the motor rotor such that the propeller blades are rotatable about the central rotational axis, wherein the second propeller blade is pivotally attached to the motor rotor to pivot about the central rotational axis independent of the motor rotor by a limited angle; and
a pivot stop disposed relative to the first and second propeller blades to mechanically limit an amount of pivoting of the second propeller blade relative to the first propeller blade,
wherein the propeller blades of the vertical propulsion unit fold or unfold between a deployed position that provides the vertical propulsion and a stowed position having a reduced drag profile during a forward motion of the aerial vehicle,
wherein the vertical propulsion unit is adapted to apply a reverse torque impulse to initiate folding of the propeller blades to the stowed position.

22. A propulsion unit, comprising:
a motor rotor that spins about a central rotational axis;
propeller blades, including first and second propeller blades, each having a proximal base mounted to the motor rotor such that the propeller blades are rotatable about the central rotational axis, wherein the second propeller blade is pivotally attached to the motor rotor to pivot about the central rotational axis independent of the motor rotor by a limited angle; and
a pivot stop configured to mechanically limit an amount of pivoting of the second propeller blade relative to the first propeller blade by engaging cutouts in the proximal bases of the first and second propeller blades.

23. The propulsion unit of claim 22, wherein the pivot stop comprises a pair of rotationally offset protrusions that engage the cutouts in the proximal bases of the first and second propeller blades.

* * * * *

UNITED STATES PATENT AND TRADEMARK OFFICE
CERTIFICATE OF CORRECTION

PATENT NO. : 10,843,795 B2  
APPLICATION NO. : 16/007918  
DATED : November 24, 2020  
INVENTOR(S) : A. Prager Page 1 of 1

It is certified that error appears in the above-identified patent and that said Letters Patent is hereby corrected as shown below:

In the Claims

| Column | Line | |
|---|---|---|
| 7 | 21 | Please change "center" to --central-- |
| 8 | 31 | Please change "center" to --central-- |

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*